United States Patent [19]
Barker

[11] Patent Number: 5,508,129
[45] Date of Patent: Apr. 16, 1996

[54] METHODS FOR EXTENDING THE CYCLE LIFE OF SOLID, SECONDARY ELECTROLYTIC CELLS

[76] Inventor: Jeremy Barker, 806 Saratoga Ave., #P101, San Jose, Calif. 95129

[21] Appl. No.: 237,747

[22] Filed: May 4, 1994

[51] Int. Cl.⁶ .................................................. H01M 10/40
[52] U.S. Cl. ............................................. 429/50; 429/192
[58] Field of Search ........................................ 429/50, 192

[56] References Cited

U.S. PATENT DOCUMENTS

| | | | |
|---|---|---|---|
| 4,822,701 | 4/1989 | Ballard et al. | 429/192 |
| 4,830,939 | 5/1989 | Lee et al. | 429/192 |
| 4,990,413 | 2/1991 | Lee et al. | 429/192 X |
| 5,085,952 | 2/1992 | North | 429/192 |

FOREIGN PATENT DOCUMENTS 279554  8/1988  European Pat. Off. .

*Primary Examiner*—Stephen Kalafut

[57] ABSTRACT

Disclosed are methods for extending the cycle life of solid, secondary electrolytic cells employing a solid electrolyte. Also disclosed are solid electrolytes comprising from greater than 80 to about 92 weight percent of electrolytic solvents which, when employed in solid, secondary electrolytic cells extend the cycle life of the cells as compared to solid, secondary electrolytic cells employing solid electrolytes having less solvent.

15 Claims, No Drawings

METHODS FOR EXTENDING THE CYCLE LIFE OF SOLID, SECONDARY ELECTROLYTIC CELLS

BACKGROUND OF THE INVENTION

1. Field of the Invention

This invention is directed to methods for extending the cycle life of solid, secondary electrolytic cells.

2. State of the Art

Electrolytic cells comprising an anode, a cathode and a solid, solvent-containing electrolyte are known in the art and are usually referred to as "solid electrolytic cells". One preferred class of solid electrolytic cells are rechargeable (secondary) lithium cells which comprise a solid electrolyte interposed between an anode comprising lithium and a composite cathode which comprises materials suitable for recycling (recharging) the cell after discharge.

A solid, secondary battery typically comprises several solid, secondary electrolytic cells wherein the current from each of the cells is accumulated by a conventional current collector so that the total current generated by the battery is roughly the sum of the current generated from each of the individual electrolytic cells employed in the battery. Such an arrangement enhances the overall current produced by the solid, secondary battery to levels which render such batteries commercially viable.

However, one problem encountered with the use of solid, secondary electrolytic cells in such batteries is limited cycle life for the battery, i.e., the number of rechargings the battery can accept before the battery is no longer able to maintain acceptable levels of capacity. Specifically, the cycle life of the solid, secondary battery is related to the cycle lives of the individual electrolytic cells comprising the battery. In general, when one of the electrolytic cells in the battery ceases to maintain acceptable levels of capacity, the battery must drain more current from the remaining electrolytic cells so as to produce the same overall level of current from the battery which results in a reduction of the capacity of the remaining electrolytic cells in the battery. In turn, this results in a significant reduction in the cycle life of these cells and hence that of the battery.

In assessing the causes of such reduced cycle life, the inventor has unexpectedly discovered that reduced cycle life in secondary electrolytic cells containing a solid, solvent-containing electrolyte interposed between the anode and a cathode is believed to arise, in part, from electrolytic solution depletion in the electrolyte during cell operation. Without being limited to any theory, it is postulated that during cell operation, the composite cathode acts as a sink for the electrolytic solvent found in the solid electrolyte and that, during cell operation, there is a migration or redistribution of such solvent from the electrolyte to the cathode. It is further postulated that after repeating cycling of the secondary cell, the migration becomes sufficiently pronounced that the amount of solvent in the electrolyte is reduced to the point that the cell impedance is increased due to an increase in resistance in the electrolyte. In turn, the increase in cell impedance leads to a reduction in cycle life for the electrolytic cell.

This problem of redistribution of electrolytic solvent during cell operation is compounded by the fact that increased cell impedance and hence shortened cycle life arises even when the maximum amount of electrolytic solvent tolerated by the manufacturing process is employed in the process of preparing the composite cathode and the solid electrolyte. Specifically, during cell manufacture, one preferred method for composite cathode preparation is to extrude a cathode paste comprising a cathode material and electrolytic solvent onto a current collector substrate and then uniformly distributing this paste over the substrate by a comma bar. In order to maintain suitable consistency of the cathode paste to permit these extrusion and distribution processes, the maximum amount of electrolytic solvent which can be employed in paste is typically about 50 weight percent based on the total weight of the paste.

Likewise, the solid electrolyte is preferably prepared from an electrolyte solution comprising a solid matrix forming monomer, an alkali salt, and an electrolytic solvent. The solvent is employed for the purpose of solubilizing alkali salts during operation of the electrolytic cell and to act as a plasticizer in the solid electrolyte whereas the solid matrix forming monomer is employed to convert the electrolyte solution from a liquid to a homogeneous solid after curing. In order to convert the electrolytic solution to a solid phase after curing, the maximum amount of electrolytic solvent which can be employed in the solution is typically no more than about 80 weight percent based on the total weight of the solution. When the electrolytic solvent in the solution exceeds this amount, the solid matrix forming monomer in solution is diluted to the point where formation of a solid matrix upon curing is inhibited.

Thus lies the heart of the problem. That is, notwithstanding the use of the maximum amount of electrolytic solvent during manufacture of the composite cathode, the composite cathode apparently has a higher capacity for such solvent. Accordingly, during cell operation, this increased capacity for electrolytic solvent leads to a redistribution of the solvent from the electrolyte to the cathode. Likewise, notwithstanding the use of the maximum amount of electrolytic solvent during manufacture of the solid electrolyte, this redistribution of electrolytic solvent during cell operation will eventually result in such a reduction in solvent in the solid electrolyte that cell impedance increases and eventually the cycle life terminates.

SUMMARY OF THE INVENTION

This invention is directed, in part, to the discovery of methods to extend the cycle life of electrolytic cells. Specifically, in the methods of this invention, after manufacture of the solid electrolyte, additional electrolytic solvent is applied to the surface of the solid electrolyte which is then maintained under conditions which permit the solvent to be absorbed into the electrolyte. In this manner, the amount of electrolytic solvent which can be maintained in solid electrolyte exceeds that which can be achieved during the manufacturing process. Specifically, solid electrolytes comprising from greater than 80 to about 95 weight percent electrolytic solvent can be prepared in this manner.

Without being limited to any theory, this incremental amount of electrolytic solvent in the solid electrolyte as compared to that obtained by conventional manufacturing processes is believed to offset, at least in part, the solvent redistributed to the composite cathode during cell operation. In any event, significant extension of the cycle life of the electrolytic cell is achieved by the methods of this invention.

Accordingly, in one of its method aspects, this invention is directed to a method for extending the cycle life of a solid, secondary electrolytic cell comprising an anode, a cathode, and a solid, solvent-containing electrolyte, which method comprises ·

(a) preparing a solid electrolyte by curing an electrolytic solution comprising from about 40 to 80 weight percent electrolytic solvent, from about 5 to 30 weight percent of prepolymer, and from about 5 to about 25 weight percent of the alkali salt each based on the total weight of the electrolytic solution;

(b) incorporating additional electrolytic solvent into the solid electrolyte prepared in (a) above so that the electrolyte comprises from greater than 80 to about 92 weight percent solvent;

(c) incorporating the solid electrolyte prepared in (b) above into a secondary electrolytic cell comprising an anode, a cathode and said solid electrolyte interposed therebetween; and (d) repeatedly charging and discharging the cell.

In another of its method aspects, this invention is directed to a method for extending the cycle life of a solid, secondary electrolytic cell comprising an anode, a cathode, and a solid, solvent-containing electrolyte, which method comprises:

(a) preparing a cathode/solid electrolyte composite wherein the cathode comprises a cyclable cathodic material and from 10 to 50 weight percent of electrolytic solvent, and further wherein the solid, solvent-containing electrolyte is derived by curing an electrolyte solution comprising from about 40 to 80 weight percent electrolytic solvent, from about 5 to 30 weight percent of prepolymer, and from about 5 to about 25 weight percent of the alkali salt each based on the total weight of the electrolyte solution;

(b) applying electrolytic solvent to the surface of solid electrolyte of the cathode/solid electrolyte composite prepared in (a) above under conditions wherein the solvent is absorbed into the electrolyte and further wherein sufficient solvent is employed such that, after application and absorption, the solid electrolyte comprises from greater than 80 to about 92 weight percent electrolytic solvent;

(c) affixing the anode to the surface of the electrolyte of the cathode/electrolyte composite prepared in (b) above; and (d) repeatedly charging and discharging the cell.

In one of its composition aspects, this invention is directed to a solid, solvent-containing electrolyte which comprises from about 4 to 10 weight percent of a solid polymeric matrix, from about 4 to about 10 weight percent of an alkali salt and from greater than 80 weight percent to about 92 weight percent of an electrolytic solvent each based on the total weight of the solid electrolyte.

In a preferred embodiment, the amount of electrolytic solvent employed in the solid-solvent containing electrolyte is from about 85 to about 92 weight percent based on the total weight of the electrolyte.

DETAILED DESCRIPTION OF THE PREFERRED EMBODIMENTS

As noted above, this invention is directed to methods for extending the cycle life of solid, secondary electrolytic cells. However, prior to discussing this invention is further detail, the following terms will first be defined.

Definitions

As used herein, the following terms have the following meanings.

The term "solid, secondary electrolytic cell" refers to a composite electrolytic cell comprising an anode, a solid, solvent-containing electrolyte and a cathode comprising a cathodic material capable of repeated discharge/charge cycles so as to permit repeated reuse wherein the electrolyte is interposed between the anode and the cathode.

The solid, solvent-containing electrolyte comprises an electrolytic solvent, an alkali salt, and a solid polymeric matrix.

The term "electrolytic solvent" (or "electrolyte solvent") refers to the solvent (i.e., plasticizer) included in the composite electrode and the electrolyte for the purpose of solubilizing alkali salts during operation of the electrolytic cell and which also act as a plasticizer. The solvent can be any low volatile aprotic polar solvent. Preferably, these materials are characterized by a boiling point greater than about 85° C. In this regard, low volatility for the electrolytic solvent simplifies manufacture of the electrolyte and improves the shelf-life of the resulting battery.

If the solid matrix forming monomer or partial polymer thereof employed in either the solid solvent-containing electrolyte or the composite electrode (cathode or anode) is cured or further cured by radiation polymerization to form the solid matrix, then the solvent should be radiation inert at least up to the levels of radiation employed. If the solid matrix forming monomer or partial polymer thereof is cured or further cured by thermal polymerization, then the solvent should be thermally inert at least up to the temperatures of thermal polymerization. Additionally, the solvent should not scavenge free radicals.

Representative examples of suitable electrolytic solvents include, by way of example, propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like, and mixtures thereof. A preferred solvent is a mixture of an organic carbonate and triglyme, with a 4:1 weight ratio mixture of propylene carbonate:triglyme being particularly preferred, as disclosed in U.S. patent application Ser. No. 08/049,212 filed on Apr. 19, 1993 which application is incorporated herein by reference in its entirety.

The term "alkali salt" refers to those salts wherein the cation of the salt is an alkali selected from the group consisting of lithium, sodium, potassium, rubidium and cesium which salts are suitable for use in the solid, solvent-containing electrolyte and in the composite electrodes of an electrolytic cell. The particular alkali salt employed is not critical and examples of suitable alkali salts include, by way of example, $LiClO_4$, $LiI$, $LiSCN$, $LiBF_4$, $LiAsF_6$, $LiCF_3SO_3$, $LiPF_6$, $NaI$, $NaSCN$, $KI$, $CsSCN$ and the like. The alkali is preferably selected from the group consisting of lithium, sodium, potassium, and cesium and most preferably is lithium.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions as defined above). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and/or from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical.

Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine

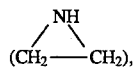

ethylene oxide

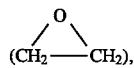

epichlorohydrine

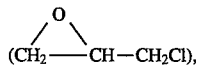

acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262, 253), acrylic acid ($CH_2=CHCOOH$), chloroacrylic acid ($ClCH=CHCOOH$), bromoacrylic acid ($BrCH=CHCOOH$), crotonic acid ($CH_3CH=CHCOOH$), propylene ($CH_3CH=CH_2$), ethylene ($CH_2=CH_2$) and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers.

Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include crosslinking between polymer backbones.

Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "anode" refers to anodes suitable for use in solid, secondary electrolytic cells. Such anodes are well known in the art and include, by way of example, anodes comprising lithium, such as metallic lithium, lithium alloys, such as alloys of lithium with aluminum, mercury, zinc, and the like, and intercalation based anodes containing lithium such as those based on carbon, tungsten oxides, and the like.

The cathode comprises a compatible cathodic material which refers to any material which functions as a positive pole (cathode) in a solid, secondary electrolytic cell and which is capable of being recharged (recycled). Such compatible cathodic materials are well known in the art and include, by way of example, manganese oxides such as $MnO_2$, $Mn_2O_4$, and the like, molybdenum trioxide, vanadium oxides such as $V_6O_{13}$, $LiV_3O_8$, $V_2O_5$, and the like, sulfides of titanium, molybdenum and niobium, and the like, chromium oxide, copper oxide, $LiCoO_2$, $LiMnO_2$, etc. The particular compatible cathodic material employed is not critical.

The term "composite electrode" refers to cathodes and anodes wherein the cathode is comprised of materials other than compatible cathodic materials and the anode is comprised of materials other than compatible anodic materials. Typically, the composite contains a polymer which acts to bind the composite materials together. This polymer is derived from a solid matrix forming monomer and/or partial polymer thereof.

Composite cathodes are well known in the art. For example, a composite cathode can comprise a compatible cathodic material, a conductive material, an electrolytic solvent, an alkali salt, and a solid polymeric matrix which is derived from a solid matrix forming monomer or partial polymer thereof.

Composite anodes are also well known in the art. For example, a composite anode can comprise a compatible intercalation anodic material, an electrolytic solvent and a solid polymeric matrix which is derived from a solid matrix forming monomer or partial polymer thereof.

The term "cycle life" refers to the number of discharge/charge cycles which can be conducted on an electrolytic cell before that cell is no longer able to maintain a capacity in the charged state equal to at least 50% of its charged capacity after fabrication.

Methodology

The methods of this invention involve the application of additional electrolyte solvent to the surface of the cured solid electrolyte prior to completing fabrication of the electrolytic cell (e.g., attachment of the anode and/or cathode to the electrolyte) and absorption of this solvent into the electrolyte. In this manner, the amount of solvent in the solid electrolyte is enhanced over amounts which are feasible via conventional methods and, in turn, this enhanced amount of solvent unexpectedly extends the cycle life of the electrolytic cell.

Sufficient additional solvent is applied onto and absorbed into the solid electrolyte so that, after absorption, the solid electrolyte comprises from greater than 80 to about 95 weight percent electrolytic solvent. The additional electrolytic solvent employed can be the same as or different than the electrolytic solvent employed during curing of the electrolyte solution to prepare the solid electrolyte. In a preferred embodiment, the additional electrolytic solvent is the same as that employed to prepare the solid electrolyte.

The solvent application conditions employed are not critical and ambient temperatures of from about 15° C. to about 25° C. are employed and preferably solvent application is conducted under anhydrous condition in an inert atmosphere. Pressure is typically atmospheric pressure although subatmospheric and super-atmospheric pressures can be employed. Application times are also not critical and are governed by the time required for the additional solvent to be absorbed into the solid electrolyte which, in turn, depends on factors such as the amount of additional solvent and the surface area of application. Such factors can be readily determined by one skilled in the art. However, in a preferred embodiment, application times of from about 1 to about 60 minutes and preferably 5 to 10 minutes are employed.

The additional electrolytic solvent is typically applied onto the surface of the solid electrolyte by conventional methods such as pipetting the requisite amount of solvent onto the electrolyte surface, spraying the solvent onto the electrolyte surface, etc. In one preferred embodiment, this additional solvent is applied onto the surface of the metallic anode and then the wetted surface of this anode is attached to the surface of the electrolyte whereupon the solvent is absorbed into the electrolyte. In another preferred embodiment, the additional electrolytic solvent is applied in a substantially uniform manner onto the surface of the solid electrolyte.

After application and absorption of the additional solvent, the resulting solid electrolyte is merely incorporated into a solid electrolytic cell comprising an anode and a cathode wherein the solid electrode is interposed therebetween.

Specifically, the cathode comprises a compatible cathodic material which functions as a positive pole (cathode) in a solid, secondary electrolytic cell and which is capable of being recharged (recycled). Preferably, the cathode is derived from a cathode paste comprising the compatible cathodic material and an electroconductive material including, by way of example, graphite, powdered carbon, powdered nickel, metal particles, conductive polymers (i.e., characterized by a conjugated network of double bonds like polypyrrole, polythiophene, polyaniline, and polyacetylene), and the like.

In a particularly preferred embodiment, the cathode is prepared from a cathode paste which comprises:

from about 35 to 65 weight percent of a compatible cathodic material;

from about 1 to 20 weight percent of an electroconductive material as described above;

from about 0 to 20 weight percent of a polyalkylene oxide film forming agent comprising repeating units of

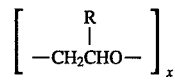

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000;

from about 10 to 50 weight percent of electrolytic solvent; and from at least about 5 weight percent to about 30 weight percent of a prepolymer, wherein all weight percents are based on the total weight of the cathode.

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. A particularly preferred current collector for the cathode is a roughened nickel (electrolytically deposited nickel) on nickel current collector (available as CF18/NiT from Fukuda Metal Foil & Powder Company, Ltd., Kyoto, Japan). Another preferred current collector is aluminum foil to which an adhesive layer has been applied. Such adhesive layers are described in the examples below as well as in U.S. patent application Ser. No. 07/968,155, filed on Oct. 29, 1992 and which is incorporated herein by reference in its entirety. Its continuation, Ser. No. 08/293,341, is now U.S. Pat. No. 5,464,707.

The current collectors are preferably attached to the surface of the cathode not facing the electrolyte but can also be attached to the anode. When the current collector is attached to the cathode, the cathode is interposed between the electrolyte and the current collector.

The solid, solvent-containing electrolyte is preferably prepared by combining a prepolymer with the alkali salt and the electrolytic solvent to form an electrolyte solution. Optionally, a film forming agent such as a polyalkylene oxide film forming agent comprising repeating units of

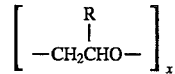

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000, can be incorporated into the electrolyte solution.

In a preferred embodiment, the resulting electrolyte solution, prior to incorporation of additional electrolytic solvent, comprises:

from about 40 to 80 weight percent electrolytic solvent based on the weight of the electrolyte solution, preferably from about 60 to 80 weight percent, and even more preferably about 75 weight percent;

from about 5 to 30 weight percent of prepolymer based on the weight of the electrolyte solution, preferably from about 10 to 25 weight percent, and even more preferably from about 10 to 15 weight percent; and from about 5 to about 25 weight percent of the alkali salt based on the weight of the electrolyte solution, preferably from about 7 to 15 weight percent, and even more preferably from about 9 to 15 weight percent.

When a polyalkylene oxide film forming agent is employed, it is preferably employed at from about 1 to 10 weight percent based on the weight of the electrolyte solution, more preferably from about 1 to 5 weight percent, and still more preferably from about 2.5 to 3.5 weight percent.

Also, when the electrolyte solution employs a polyalkylene oxide film forming agent, it is preferably mixed in the manner described hereinbelow in Example 1.

The resulting solution is preferably uniformly coated onto the cathode prepared as described above by means of a roller, a doctor blade, a bar coater, a silk screen or spinner to obtain a film of this solution over the cathode. However, other substrates can be used such as aluminum foil, glass plates, the lithium anode, etc.

In order to enhance the application of the electrolyte solution onto the cathode or other substrate, this solution is preferably a liquid and even more preferably has a viscosity of from about 500 to about 10,000 centipoise at 25° C. and still more preferably has a viscosity of from about 1000 to about 4000 centipoise at 25° C. In some cases, it may be necessary to heat the solution so as to reduce the viscosity of the solution thereby providing for a coatable material.

Preferably, the amount of electrolyte solution coated onto the substrate is an amount sufficient so that after curing, the resulting solid, solvent-containing electrolyte has a thickness of no more than about 250 microns (µm). Preferably, the solid, solvent-containing electrolyte has a thickness of from about 25 to about 250 microns, more preferably from about 50 to about 150 microns, and even more preferably from about 50 to about 80 microns.

The composition is cured by conventional methods to form a solid, solvent-containing electrolyte. For example, when the prepolymer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like). When curing is by UV radiation, the initiator is typically benzophenone, Darocur 1173 (Ciba Geigy, Ardsley, N.Y.), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In an alternative embodiment, the liquid electrolyte composition containing such prepolymers can be applied over a layer of cathode paste which itself is formed over a layer of solid electrically-conducting adhesion-promoter found on a metal foil. Both the cathode paste and the liquid electrolyte composition are simultaneously cured by exposure to, for example, electron beams so as to provide for a cured composite containing both the cured cathode and the cured electrolyte.

In still another alternative embodiment, the solid polymeric matrix (e.g., formed by polymerization of a prepolymer) can be dissolved into a suitable volatile solvent and the requisite amounts of the alkali salt and electrolytic solvent are then added. The mixture is then applied onto a suitable substrate (e.g., the surface of the cathode opposite to the current collector) in the manner set forth above and the volatile solvent removed by conventional techniques (e.g., evaporation) to provide for a solid, single phase, electrolyte. Suitable volatile solvents preferably have a boiling point of less than 85° C. and more preferably from about 45° to less than 85° C. Particularly preferred volatile solvents are aprotic solvents. Examples of suitable volatile solvents include acetonitrile, tetrahydrofuran, and the like. However, acetonitrile is not preferred if it is to contact the anode.

In any event, the resulting electrolyte is a homogeneous, single phase material which is maintained upon curing, and does not readily separate upon cooling to temperatures below room temperature. See, for example, U.S. Pat. No. 4,925,751 which is incorporated herein by reference in its entirety. Additionally, during storage of the current collector/cathode/electrolyte composite, it is preferred to cover the electrolyte with a Mylar film or other inert film.

After incorporation of the additional electrolyte solvent in the manner described above, the resulting solid, solvent-containing electrolyte comprises from about 4 to 10 weight percent of a solid polymeric matrix, from about 4 to about 10 weight percent of an alkali salt and from greater than 80 weight percent to about 92 weight percent of an electrolytic solvent each based on the total weight of the solid electrolyte. When a polyethylene oxide film forming agent is employed, it is contained in the resulting electrolyte in an amount ranging from about 2 to about 5 weight percent.

In a preferred embodiment, a metallic anode (e.g., lithium anode) is then laminated onto the electrolyte so as to fabricate an electrolytic cell having an anode, a cathode and interposed therebetween, a solid, solvent-containing electrolyte.

Methods for preparing solid electrolytes and electrolytic cells are also set forth in U.S. Pat. Nos. 4,830,939 and 4,925,751 which are incorporated herein by reference in their entirety.

Utility

The methods of this invention enhance the cycle life of solid, secondary electrolytic cells as demonstrated by the examples set forth hereinbelow.

The following examples are offered to illustrate the present invention and should not be construed in any way as limiting its scope.

EXAMPLES

The following Example 1 illustrates a method of how an electrolytic cell of this invention could be fabricated.

EXAMPLE 1

A solid electrolytic cell is prepared by first preparing a cathodic paste which is spread onto a current collector. An electrolyte solution is then placed onto the cathode surface and the cathode paste and electrolyte solution are simultaneously cured to provide for the solid electrolyte composition. Additional electrolytic solvent is then applied onto the surface of the cured electrolyte and permitted to be absorbed into the solid electrolyte. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by industry specifications as either 1235-H19 (99.35% min. Al), or 1145-H19 (99.45% min. Al), both of which are available from All Foils, Inc., Brooklyn Heights, Ohio.

The adhesion promoter layer is prepared as a dispersed colloidal solution in one of two methods. The first preparation of this colloidal solution for this example is as follows:

84.4 parts by weight of carbon powder (Shawinigan Black™—available from Chevron Chemical Company, San Ramon, Calif.)
 337.6 parts by weight of a 25 weight percent solution of polyacrylic acid (a reported average molecular weight of about 90,000, commercially available from Aldrich Chemical Company—contains about 84.4 grams polyacrylic acid and 253.2 grams water)
 578.0 parts by weight of isopropanol In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil (about 9 inches wide and about 0.0005 to about 0.001 inches thick). After application, the solvent is evaporated by placing the mixture/foil into a conventional oven. After evaporation, an electrically-conducting adhesion-promoter layer of about 4–6 microns in thickness is formed. The aluminum foil is then cut to about 8 inches wide by removing approximately ½ inch from the sides with a conventional slitter so as to remove any uneven edges; the foil can then be further cut to the desired size.

The second preparation of this colloidal solution comprises mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from B. F. Goodrich, Cleveland, Ohio, as Good-Rite K702 —contains about 25 lbs polyacrylic acid and 75 lbs water) and with 18.5 lbs of isopropanol. Stirring is done in a 30 gallon polyethylene drum with a gear-motor mixer (e.g., Lighting Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 microns with the occasional 12.5 micron particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 microns cloth filter (e.g., So-Clean Filter Systems, American Felt and Filter Company, Newburgh, N.Y.) and coated as described above.

B. The Cathode

The cathode is prepared from a cathodic paste which, in turn, is prepared from a cathode powder as follows:

i. Cathode Powder

The cathode powder is prepared by combining 94.1±1.1 weight percent $V_6O_{13}$ [prepared by heating ammonium metavanadate ($NH_4^+VO_3^-$) at 450° C. for 16 hours under $N_2$ flow] and 5.9±1.1 weight percent of carbon (available from AKZO Chemicals, Inc., Chicago, Ill., under the tradename of Ketjen Black EC 600JD™). About 100 grams of the resulting mixture is placed into a grinding machine (Attritor Model S-1 available from Union Process, Akron, Ohio) and ground for 30 minutes starting at 150 rpm and adjusted to about 250 rpm approximately 10 seconds later and held at that speed for the remainder of the 30 minute duration. Afterwards, the resulting mixture is passed through a 200 mesh screen and then dried in a vacuum or in an inert gas atmosphere (e.g., argon) to produce a cathode powder with a water content of less than about 1000 ppm and preferably less than about 700 ppm.

ii. Cathode Paste

A cathode paste is prepared by combining sufficient cathode powder to provide for a final product having about 53 weight percent $V_6O_{13}$. The paste contains the following (in approximate weight percent):

| | |
|---|---|
| $V_6O_{13}$ | 53% |
| Carbon | 3.7% |
| 4:1 propylene carbonate/triglyme | 31.9% |
| polyethylene oxide | 2% |
| polyethylene glycol diacrylate | 8% |
| ethoxylated trimethylolpropane triacrylate | 1.4% |

The method of preparing 100 grams of the cathode paste is as follows:

31.9 grams of a solvent having a 4:1 weight ratio of propylene carbonate: triglyme is mixed with 8 grams of polyethylene glycol diacrylate (molecular weight about 400 available as SR-344 from Sartomer Company, Inc., Exton, Pa.) and 1.4 grams of ethoxylated trimethylol-propane triacrylate (TMPEOTA) (molecular weight about 450 and available as SR-454 from Sartomer Co., Inc.) in a double planetary mixer (Ross No. 2 mixer, available from Charles Ross & Sons, Co., Hauppage, N.Y.) to form a solvent solution.

53 grams of $V_6O_{13}$, 3.7 grams of carbon, and 2 grams of polyethylene oxide are mixed in a V-blender before being transferred to the double planetary mixer where the blend is stirred at 7.5 Hz and 25° C. (The polyethylene oxide preferably is vacuum dried at 350° C. for three hours prior to use.) The above solvent solution is first passed through 4A molecular sieves and then added to the $V_6O_{13}$ and carbon blend under vacuum mixing over a 5 minute period. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The resulting cathode paste is maintained at about 45° C. until applied onto the current collector. The so-prepared cathode paste can be placed onto the adhesion layer of the current collector by extrusion at a temperature of from about 45° to about 48° C. The extruded cathode paste is then spread to a substantially uniform thickness of about 50–120 microns over the current collector by a comma bar.

C. Electrolyte 60.19 grams of propylene carbonate, 15.05 grams of triglyme, and 11.93 grams of urethane acrylate (Actilane SP023, available from Akcros Chemicals, Ltd., Manchester, United Kingdom) are combined at room temperature until homogeneous. The resulting solution is optionally passed through a column of 4A molecular sieves to remove water and then mixed at room temperature until homogeneous.

At this point, 3 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent is dissolved. A thermocouple is placed at the edge of the vortex created by the magnetic stirrer to monitor solution temperature. The solution is cooled to a temperature of less than 48° C. and then 9.83 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one optional embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[a] |
|---|---|---|
| Propylene Carbonate | 60.19 g | 60.19 |
| Triglyme | 15.05 g | 15.05 |
| Urethane Acrylate | 11.93 g | 11.93 |
| $LiPF_6$ | 9.83 g | 9.83 |
| PEO Film Forming Agent | 3.00 g | 3.00 |
| Total | 100 g | 100 |

[a]weight percent based on the total weight of the electrolyte solution (100 g)

This solution is then degassed to provide for an electrolyte solution wherein little, if any, of the $LiPF_6$ salt decomposes.

Optionally, the above solution which contains the prepolymer, the polyalkylene oxide film forming agent, the electrolytic solvent and the $LiPF_6$ salt, is filtered to remove any solid particles or gels remaining in the solution. One suitable filter device is a sintered stainless steel screen having a pore size between 1 and 50 microns at 100% efficiency.

In the alternative embodiment, the electrolyte solution is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over 4A molecular sieves (Grade 514, 8–12 Mesh from Schoofs Inc., Moraga, Calif.) and then proceed to step 4.

2. Dry the propylene carbonate and triglyme over 4A molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowly to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent and is light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C. and preferably does not exceed about 40° C.

8. After the final addition of the $LiPF_6$ salt, stir for an additional 30 minutes, degas, and let sit overnight and cool.

9. Filter the solution through a sintered stainless steel screen having a pore size between 1 and 50 microns at 100% efficiency.

At all times, the temperature of the solution should be monitored with a thermocouple which should be placed in the vortex formed by the mixer.

Afterwards, the electrolyte mixture is then coated by a slot die coater to a thickness of about 25–50 microns onto the surface of the extruded cathode paste prepared as above. The electrolyte and cathode paste are then simultaneously cured by continuously passing the sheet through an electron beam apparatus (available as a Broad Beam electron beam processor from RPC Industries, Hayward, Calif.) at a voltage of about 250 kV and a current of about 48 mA and at a conveyor speed of 50 ft/minute. After curing, a composite is recovered which contains a solid electrolyte attached to a solid cathode which is affixed to a current collector.

After fabrication of the solid electrolyte/cathode/current collector composite, approximately 4 microliters per square centimeter of electrolyte solvent containing a 4:1 mixture of propylene carbonate and triglyme is applied onto the surface of the solid electrolyte by dispersement from a pipette so as to provide substantially uniform application of the solvent onto the electrolyte surface. Application is conducted at about 20°–25° C. and, after application, the electrolyte is maintained at ambient conditions for a period of about 5–10 minutes to permit the solvent to absorb into the solid electrolyte. At this point, the electrolyte has approximately 85 weight percent electrolytic solvent.

D. Anode

The anode comprises a sheet of lithium foil (about 50 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte of the above described electrolyte/cathode composite. Lamination is accomplished by minimal pressure.

Example 2

Four electrolytic cells were prepared in a manner similar to that described above except that:

1. each of these cells employed the second preparation for the colloidal adhesive solution which is applied onto the current collector;

2. each of these cells employed the second procedure for preparing the electrolyte solution and contains the following weight percent components:

| Propylene Carbonate | 60.19 weight percent |
| Triglyme | 15.05 weight percent |
| Urethane Acrylate[b] | 11.93 weight percent |
| LiPF$_6$ | 9.83 weight percent |
| PEO Film Forming Agent[c] | 3.00 weight percent |

[b](Photomer 6140, available from Henkel Corp., Coating and Chemical Division, Ambler, PA)
[c]polyethylene oxide film forming agent having a number average molecular weight of about 600,000 (available as Polyox WSR-205 from Union Carbide Chemicals and Plastics, Danbury, CT)

3. two cells did not include additional electrolytic solvent after formation of the electrolytic cells and were designated as CONTROL A and CONTROL B and the other two cells employed 2 μL/cm$^2$ of a 4:1 mixture of propylene carbonate and triglyme as the additional electrolytic solvent and are designated as Cell Nos. 1 and 2.

These electrolytic cells were fabricated in a charged state and had an initial potential of about 3.6 volts. The cells were then repetitively cycled from a charged potential of 3.0 volts to a discharge potential of 1.8 volts. Recharging was conducted at a rate of about 0.25 milliamps per cm$^2$ and discharging was conducted at a rate of about 1 milliamps per cm$^2$. During each cycle, the capacity the charged cell was able to maintain was measured. The cycle number at which each cell was no longer able to maintain a capacity in the charged state equal to at least 50% of its charged capacity after fabrication was also recorded. The results of this analysis are reported in Table I below:

TABLE I

| Cell No. | Amount of Additional Solvent | Total Solvent in Electrolyte | # of Cycles[1] |
|---|---|---|---|
| CONTROL A | none | 75 weight % | 37 |
| CONTROL B | none | 75 weight % | 43 |
| 1 | 2 μL/cm$^2$ | 85 weight % | 127 |
| 2 | 2 μL/cm$^2$ | 85 weight % | 125 |

[1]# of Cycles = number of cycles of the electrolytic cell prior to termination of cycle life The above data demonstrates that the absorption of additional solvent into the solid electrolyte significantly extends the cycle life of the electrolytic cell as compared to similar cells were additional solvent was not added.

What is claimed is:

1. A method for extending the cycle life of a solid, secondary electrolytic cell comprising an anode, a cathode, and a solid, solvent-containing electrolyte, which method comprises:

(a) preparing a solid electrolyte by curing an electrolytic solution comprising from about 40 to 80 weight percent electrolytic solvent, from about 5 to 30 weight percent of prepolymer, and from about 5 to about 25 weight percent of the alkali salt each based on the total weight of the electrolytic solution;

(b) incorporating additional electrolytic solvent into the solid electrolyte prepared in (a) above so that the electrolyte comprises solvent in an amount from greater than 80 to less than or equal to about 92 weight percent;

(c) incorporation the solid electrolyte prepared in (b) above into a secondary electrolytic cell comprising an anode, a cathode and said solid electrolyte interposed therebetween; and (d) repeatedly charging and discharging the cell.

2. A method for extending the cycle life of a secondary electrolytic cell comprising an anode, a cathode, and a solid, solvent-containing electrolyte wherein the electrolyte is interposed between the anode and the cathode, which method comprises:

(a) preparing a cathode/solid electrolyte composite wherein the cathode comprises a cyclable cathodic material and from 10 to 50 weight percent of electrolytic solvent, and
   further wherein the solid, solvent-containing electrolyte is derived by curing an electrolyte solution comprising from about 40 to 80 weight percent electrolytic solvent, from about 5 to 30 weight percent of prepolymer, and from about 5 to about 25 weight percent of the alkali salt each based on the total weight of the electrolyte solution;

(b) applying electrolytic solvent to the surface of said electrolyte of the cathode/solid electrolyte composite prepared in (a) above under conditions wherein the solvent is absorbed into the electrolyte and further wherein sufficient solvent is employed such that, after application, the solid electrolyte comprises electrolytic solvent in an amount from greater than 80 to less than or equal to about 92 weight percent;

(c) affixing the anode to the surface of the electrolyte of the cathode/electrolyte composite prepared in (b) above; and (d) repeatedly charging and discharging the cell.

3. The method according to claim 1 wherein, after absorption of additional electrolytic solvent, the solid electrolyte comprises from about 85 to about 92 weight percent of said solvent.

4. The method according to claim 2 wherein, after absorption of additional electrolytic solvent, the solid electrolyte comprises from about 85 to about 92 weight percent of said solvent.

5. The method according to claim 1 wherein said anode comprises lithium.

6. The method according to claim 5 wherein said lithium anode is selected from the group consisting of metallic lithium; alloys of lithium with aluminum, mercury, or zinc; and lithium intercalation anodes comprising lithium and a conductive material selected from the group consisting of carbon powder, graphite and tungsten oxides.

7. The method according to claim 2 wherein said anode comprises lithium.

8. The method according to claim 7 wherein said lithium anode is selected from the group consisting of metallic lithium; alloys of lithium with aluminum, mercury, or zinc; and lithium intercalation anodes comprising lithium and a conductive material selected from the group consisting of carbon powder, graphite and tungsten oxides.

9. The method according to claim 1 wherein the cathode comprises a vanadium oxide.

10. The method according to claim 9 wherein the vanadium oxide is selected from the group consisting of $V_6O_{13}$, $LiV_3O_8$ and $V_2O_5$.

11. The method according to claim 2 wherein the cathode comprises a vanadium oxide.

12. The method according to claim 11 wherein the vanadium oxide is selected from the group consisting of $V_6O_{13}$, $LiV_3O_8$ and $V_2O_5$.

13. A solid, solvent-containing electrolyte which comprises from about 4 to 10 weight percent of a solid polymeric matrix, from about 4 to about 10 weight percent of an alkali salt and an electrolytic solvent in an amount from greater than 80 weight percent to about 92 weight percent, each based on the total weight of the solid electrolyte.

14. A solid, solvent-containing electrolyte according to claim 13 wherein the amount of electrolytic solvent comprises from about 85 to about 92 weight percent based on the total weight of the solid electrolyte.

15. A solid, solvent-containing electrolyte according to claim 13 which further comprises from about 2 to about 5 weight percent of a polyalkylene oxide film forming agent.

* * * * *